US011716365B2

(12) United States Patent
Clausen et al.

(10) Patent No.: US 11,716,365 B2
(45) Date of Patent: Aug. 1, 2023

(54) METHOD COMPUTER PROGRAM AND DRIVER UNIT FOR STREAMING GAZE DATA PACKETS

(71) Applicant: Tobii AB, Danderyd (SE)

(72) Inventors: Anders Clausen, Danderyd (SE); Daniel Tornéus, Danderyd (SE)

(73) Assignee: Tobii AB, Danderyd (SE)

( * ) Notice: Subject to any disclaimer, the term of this patent is extended or adjusted under 35 U.S.C. 154(b) by 101 days.

(21) Appl. No.: 17/007,397

(22) Filed: Aug. 31, 2020

(65) Prior Publication Data

US 2021/0112107 A1 Apr. 15, 2021

Related U.S. Application Data

(63) Continuation of application No. 16/713,350, filed on Dec. 13, 2019, now abandoned.

(30) Foreign Application Priority Data

Dec. 12, 2018 (SE) .................................... 1851562-7

(51) Int. Cl.
*H04L 65/60* (2022.01)
*G02B 27/00* (2006.01)
(Continued)

(52) U.S. Cl.
CPC .......... *H04L 65/60* (2013.01); *G02B 27/0093* (2013.01); *G06F 3/013* (2013.01);
(Continued)

(58) Field of Classification Search
None
See application file for complete search history.

(56) References Cited

U.S. PATENT DOCUMENTS 10,712,817 B1* 7/2020 Ronngren ................ G09G 5/37
10,802,287 B2* 10/2020 Selan ....................... G09G 3/22
(Continued)

FOREIGN PATENT DOCUMENTS

CN 103959767 A 7/2014
CN 106164818 A 11/2016
(Continued)

OTHER PUBLICATIONS

U.S. Appl. No. 62/910,936 (Year: 2019).*
(Continued)

*Primary Examiner* — June Sison
(74) *Attorney, Agent, or Firm* — Christopher I. Moylan

(57) ABSTRACT

Data packets containing gaze data are streamed from an eyetracker to a client via a driver unit by receiving, repeatedly, gaze data packets in a first interface; and, providing, repeatedly, via a second interface, gaze data packets. The client sends a request message to the driver unit. The request message defines a delivery point in time in a first time frame structure at which delivery point in time in each frame of the first time frame structure the gaze data packet shall be provided to the client via the second interface. An offset is calculated between a reception point in time and the delivery point in time. The reception point in time indicates when a gaze data packet is received from the eyetracker relative to the first time structure. An adjusted data acquisition instance is assigned based on the offset. The adjusted data acquisition instance represents a modified point in time in a second time frame structure when at least one future gaze data packet shall be produced by the eyetracker. The driver unit sends a control message to the eyetracker. The control message is adapted to cause the eyetracker to produce the at least one future gaze data packet at such an adjusted acquisition instance in the second time structure that the reception point (Continued)

in time for the at least one future gaze data packet is expected to lie within a margin prior to the delivery point in time.

11 Claims, 3 Drawing Sheets

(51) Int. Cl.
*G06F 3/01* (2006.01)
*H04L 43/0852* (2022.01)
*H04L 65/80* (2022.01)
*H04L 67/10* (2022.01)
*G02B 27/01* (2006.01)

(52) U.S. Cl.
CPC .......... *G06F 3/017* (2013.01); *H04L 43/0852* (2013.01); *H04L 65/80* (2013.01); *H04L 67/10* (2013.01); *G02B 27/0172* (2013.01)

(56) References Cited

U.S. PATENT DOCUMENTS

| | | | | |
|---|---|---|---|---|
| 11,163,995 | B2* | 11/2021 | Novelli | G06T 7/62 |
| 11,169,604 | B2* | 11/2021 | Barkman | G06F 3/013 |
| 2009/0105850 | A1 | 4/2009 | Miyata et al. | |
| 2013/0343472 | A1 | 12/2013 | Scherr | |
| 2016/0282936 | A1 | 9/2016 | Larson et al. | |
| 2017/0041897 | A1 | 2/2017 | Pitigoi-Aron et al. | |
| 2017/0235362 | A1 | 8/2017 | Thunström et al. | |
| 2017/0302918 | A1 | 10/2017 | Mammou et al. | |
| 2019/0243472 | A1* | 8/2019 | Stafford | G02B 27/017 |
| 2021/0104211 | A1* | 4/2021 | John | G06F 1/12 |
| 2021/0289336 | A1* | 9/2021 | Zhang | H04W 4/12 |
| 2021/0350550 | A1* | 11/2021 | Stengel | G06N 3/08 |

FOREIGN PATENT DOCUMENTS

| | | |
|---|---|---|
| CN | 107742512 A | 2/2018 |
| EP | 3249497 A1 | 11/2017 |
| WO | 2014083806 A1 | 6/2014 |
| WO | 2015127361 A1 | 8/2015 |

OTHER PUBLICATIONS

Swedish search report completed Aug. 29, 2019 regarding patent application SE 1851562-7.
European search report completed Mar. 31, 2020 regarding patent application EP 19 21 2255.
Troung Vihn Phan, "Development of a custom application for the Tobii eye trackers," Bachelor Thesis, Hamburg University of Applied Science, Aug. 24, 2011.

* cited by examiner

METHOD COMPUTER PROGRAM AND DRIVER UNIT FOR STREAMING GAZE DATA PACKETS

CROSS-REFERENCES TO RELATED APPLICATIONS

This application is a continuation of U.S. patent application Ser. No. 16/713,350, filed Dec. 13, 2019, which claims priority to Swedish Application No. 1851562-7, filed Dec. 12, 2018; the content of which are hereby incorporated by reference.

TECHNICAL FIELD

The invention relates generally to efficient handling of gaze data. In particular, the present invention concerns a method for streaming gaze data packets, a driver unit performing this method and a computer system arranged to implement a gaze-data based service. The invention also relates to a computer program product and a non-volatile data carrier.

BACKGROUND

Eye/gaze tracking is the process of measuring the motion of an eye relative to the head, or the point of gaze. An eyetracker is a device for measuring eye positions and eye movement. Eyetrackers are used in many different applications. There are various methods for measuring eye movement. The most popular variant uses video images from which the eye position is extracted. Other methods use search coils, or are based on the electrooculogram. Originally, eyetracking technology was used in research on the visual system, in psychology, in psycholinguistics, marketing and in product design. Today, we see an increasing use of eyetrackers as input devices for human-computer interaction in various kinds of devices and apparatuses from smartphones to aircrafts. This development places a demand for convenient and efficient access to the eyetracker output data from third party devices and applications, i.e. so-called clients.

U.S. Pat. No. 9,983,406 describes an operating method of a display apparatus, which includes calculating a range of a movement of a user based on eye movement information indicating movements of the eyes of the user; and adjusting a stereoscopic depth of a three-dimensional image based on the range of the movement. When changing from a 3D rendering scheme to a 2D rendering scheme, the method involves considering a latency caused by an eyetracker to acquire the eye movement information.

However, the general problem of tackling latency in the data stream from the eyetracker to a client remains to be solved.

SUMMARY

One object of the present invention is therefore to offer a solution for providing gaze data to a client in such a manner that the gaze data are as fresh as possible when received by the client.

According to one aspect of the invention, this object is achieved by a method performed in a driver unit for streaming gaze data packets containing gaze data from an eyetracker to a client. The method involves receiving, repeatedly, in a first interface, gaze data packets from the eyetracker; and providing, repeatedly, via a second interface, gaze data packets to the client. The method further involves receiving from the client a request message defining a delivery point in time in a first time frame structure at which delivery point in time in each frame of the first time frame structure the gaze data packet shall be provided to the client via the second interface. I.e. the request message specifies when the client wishes to receive gaze data. Moreover, the method involves calculating an offset between a reception point in time and the delivery point in time. The reception point in time indicates when a gaze data packet is received from the eyetracker relative to the first time structure. Then, based on the offset, an adjusted data acquisition instance is assigned. The adjusted data acquisition instance represents a modified point in time in a second time frame structure when at least one future gaze data packet shall be produced by the eyetracker. In other words, the adjusted data acquisition instance adapts the timing of eyetracker's data recording occasion to the latency caused by the eyetracker, the driver unit and the transmission path there between. Additionally, the method involves sending a control message to the eyetracker. The control message is adapted to cause the eyetracker to produce the at least one future gaze data packet at such an adjusted acquisition instance in the second time structure that the reception point in time for the at least one future gaze data packet is expected to lie within a margin prior to the delivery point in time.

This method is advantageous because it ensures that the freshest possible gaze data are available to the client when the client requests access to these data. Preferably, to reduce the risk that the gaze data arrive too close in time to the delivery point in time, the adjusted acquisition instance in the second time structure is such that the expected reception point in time is at least a safety time prior to the delivery point in time.

Preferably, in addition to the above offset, the adjusted data acquisition instance is also assigned on the basis of a latency in the eyetracker and a transmission delay between the eyetracker and the driver unit. Thereby, the initial data path is modeled adequately, and the timing of the gaze data can be made even more accurate with respect to the client's request.

According to one embodiment of this aspect of the invention, the method further involves synchronizing the second time frame structure to the first time frame structure, such that the first and second frame structures share a common time base reference. As a result, no time slippage will occur, and therefore no further timing adjustments are needed, at least not theoretically.

According to another embodiment of this aspect of the invention, the synchronizing of the second time frame structure to the first time frame structure involves adjusting an interval between consecutive data acquisition instances to match a period of the first time frame structure. Of course, such an adjustment is most efficiently attained by associating the first and second frame structures to a common time base reference.

According to yet another embodiment of this aspect of the invention, wherein the first frame structure is synchronized to a first time base reference being different from a second time base reference to which the second time frame structure is synchronized. Here, method further involves calculating, repeatedly, an updating of the offset between the reception point in time and the delivery point in time. If the updated offset does not lie within the margin prior to the delivery point in time, the method involves sending an updated control message to the eyetracker. The updated control message is adapted to cause the eyetracker to produce at least one future gaze data packet at such an adjusted acquisition instance in the second time structure that the reception point in time for the at least one future gaze data packet is expected to lie within the margin prior to the delivery point in time. Thus, any time slippage between the first and second frame structures can be compensated for efficiently.

According to a further aspect of the invention the object is achieved by a computer program containing instructions which, when executed in a processing circuitry, cause the processing circuitry to carry out the above-described method.

According to another aspect of the invention, the object is achieved by a non-volatile data carrier containing such a computer program.

According to yet another aspect of the invention, the above object is achieved by a driver unit adapted to stream gaze data packets containing gaze data from an eyetracker to a client. The driver unit contains first and second interfaces and a processing circuitry. The first interface is configured to receive, repeatedly, gaze data packets from the eyetracker. The second interface is configured to provide, repeatedly, gaze data packets to the client. The processing circuitry is configured to control the overall functioning of the driver unit as follows. From the client, the driver unit receives a request message, which defines a delivery point in time in a first time frame structure. The delivery point in time indicates when, in each frame of the first time frame structure, the gaze data packet shall be provided to the client via the second interface. The processing circuitry is further configured to calculate an offset between a reception point in time and the delivery point in time. The reception point in time indicates when a gaze data packet is received from the eyetracker relative to the first time structure. Additionally, the processing circuitry is configured to assign an adjusted data acquisition instance based on the offset. The adjusted data acquisition instance represents a point in time in a second time frame structure when at least one future gaze data packet shall be produced by the eyetracker. Moreover, via a control interface, the driver unit is configured to send a control message to the eyetracker. The control message is adapted to cause the eyetracker to produce the at least one future gaze data packet at such an adjusted acquisition instance in the second time structure that the reception point in time for the at least one future gaze data packet is expected to lie within a margin prior to the delivery point in time. The advantages of this driver unit, as well as the preferred embodiments thereof, are apparent from the discussion above with reference to the method for streaming gaze data packets.

According to still another aspect of the invention, the object is achieved by a computer system arranged to implement at least one gaze-data based service. The system contains the above-described driver unit, an eyetracker configured to produce data packets containing gaze data to the driver unit, and a client configured to receive the data packets from the driver unit, and based on the data packets implement said at least one gaze-data based service. The advantages of this system are likewise apparent from the discussion above with reference to the method for streaming gaze data packets.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
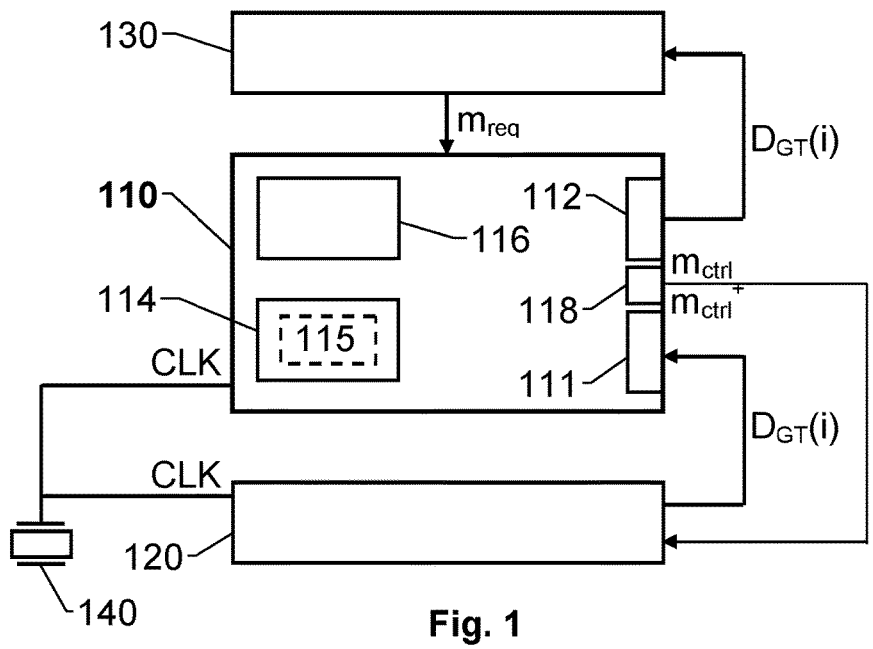
FIG. 1 shows a block diagram over a computer system including an eyetracker, a driver unit and a client according to a first embodiment of the invention.

FIG. 1 shows a block diagram over a computer system according to a first embodiment of the invention, which computer system is arranged to implement at least one gaze-data based service. The computer system includes an eyetracker 120, a driver unit 110 and a client 130.

The driver unit 110, in turn, contains a processing circuitry 116, which for example may include one or more general-purpose processors. The processing circuitry 116 is further preferably communicatively connected to a data carrier 114 in the form computer-readable storage medium, such as a Random Access Memory (RAM), a Flash memory, or the like. The data carrier 114 contains computer-executable instructions, i.e. a computer program 115, for causing the processing circuitry 116 to perform in accordance with the embodiments of the invention as described herein, when the computer-executable instructions are executed in the processing circuitry 116.

The driver unit 110 is adapted to stream gaze data packets $D_{GT}(i)$ from the eyetracker 120 to the client 130. The gaze data packets $D_{GT}(i)$ contain gaze data, i.e. typically information relating to how at least one eye of a user is moved relative to the user's head and/or how a gaze point of a user is moved across a particular surface, e.g. a display.

Figure 2:
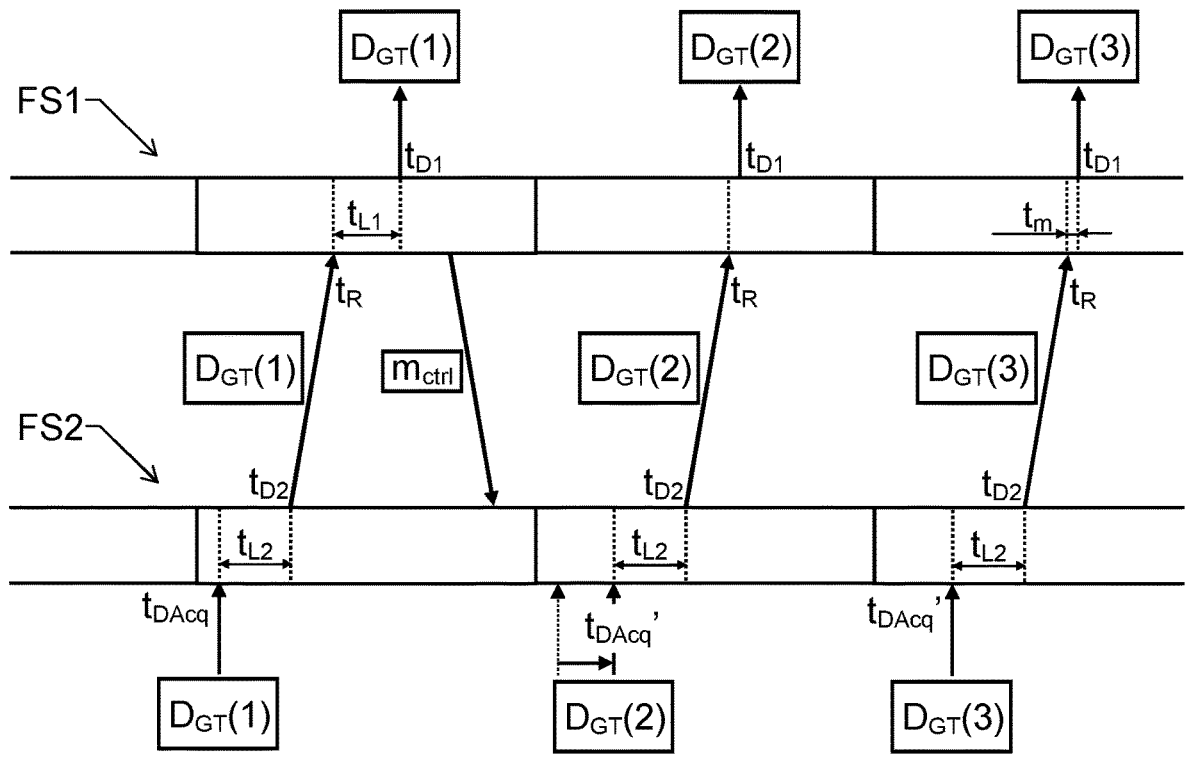
FIG. 2 illustrates, by an example, how gaze data packets and a control message are exchanged between the eyetracker, the driver unit and the client.

Referring now also to FIG. 2, we see an example how gaze data packets $D_{GT}(1)$, $D_{GT}(2)$ and $D_{GT}(3)$ respectively are received in the driver unit 110 and forwarded to the client 130. Specifically, in the driver unit 110, a first interface 111 is configured to receive, repeatedly, the gaze data packets $D_{GT}(1)$, $D_{GT}(2)$ and $D_{GT}(3)$ from the eyetracker 120; and a second interface 112 is configured to provide, repeatedly, the gaze data packets $D_{GT}(1)$, $D_{GT}(2)$ and $D_{GT}(3)$ to the client 130.

The processing circuitry 116 is configured to control the overall functioning of the driver unit 110. Inter alia, this means that the processing circuitry 116 controls the driver unit 110 to receive a request message $m_{req}$ from the client 130. The request message $m_{req}$ defines a delivery point in time $t_{D1}$ in a first time frame structure FS1. The delivery point in time designates $t_{D1}$ when, in each frame of the first time frame structure FS1 the gaze data packet shall be provided to the client 130 via the second interface 112 in order to best suit a functionality being implemented in the client 130, such as for example an input device for human-computer interaction in the form of a head-mounted display (HUD).

Additionally, the processing circuitry 116 is configured to calculate an offset $t_{L1}$ between a reception point in time $t_R$ and the delivery point in time $t_{D1}$. The reception point in time $t_R$ indicates when a gaze data packet is received from the eyetracker 120 relative to the first time structure FS1. Based on the offset $t_{L1}$, the processing circuitry 116 is configured to assign an adjusted data acquisition instance $t_{DAcq}'$, which represents a point in time in a second time frame structure FS2 when at least one future gaze data packet. $D_{GT}(2)$ and $D_{GT}(3)$ in FIG. 2, shall be produced by the eyetracker 120.

Via a control interface 118, the driver unit 110 is configured to send a control message $m_{ctrl}$ to the eyetracker 120. The control message $m_{ctrl}$ is adapted to cause the eyetracker 120 to produce the at least one future gaze data packet $D_{GT}(2)$ and $D_{GT}(3)$ at such an adjusted acquisition instance $t_{DAcq}'$ in the second time structure FS2 that the reception point in time $t_R$ for each of the at least one future gaze data packet $D_{GT}(2)$ and $D_{GT}(3)$ is expected to lie within a margin $t_m$ prior to the delivery point in time $t_{D1}$. Thus, the eyetracker 120 regards the control message $m_{ctrl}$ as an instruction for setting its timing of the gaze data recording occasion. This adjustments enables use of the freshest possible gaze data to be delivered in the client 130 when such data are requested.

To safeguard that the future gaze data packets $D_{GT}(2)$ and $D_{GT}(3)$ do not arrive with too small a margin to the delivery point in time $t_{D1}$—and thus enable the client 130 to handle the gaze data being carried in these data packets $D_{GT}(2)$ and $D_{GT}(3)$—the adjusted acquisition instance $t_{DAcq}'$ in the second time structure FS2 is preferably set such that the expected reception point in time $t_R$ is at least a safety time $t_{SAFE}$ prior to the delivery point in time $t_{D1}$.

Figure 3:
FIG. 3 shows one example of a time sequence according to the first embodiment of the invention.

In FIG. 3, a graph illustrates one example of a time sequence according to the first embodiment of the invention (shown in FIG. 1), where the driver unit 110 and the eyetracker 120 are connected to one and the same clock generator 140 that is configured to provide a common time base reference CLK for the first and second frame structures FS1 and FS2 respectively. Naturally, this is advantageous in terms of maintaining a stable temporal relationship between the first and second frame structures FS1 and FS2. In FIG. 3, this is reflected by the fact that once the adjusted acquisition instance $t_{DAcq}'$ has been set, the updated offset $t_{L1}$ may remain essentially constant over time t, and within the margin $t_m$.

Figure 4:
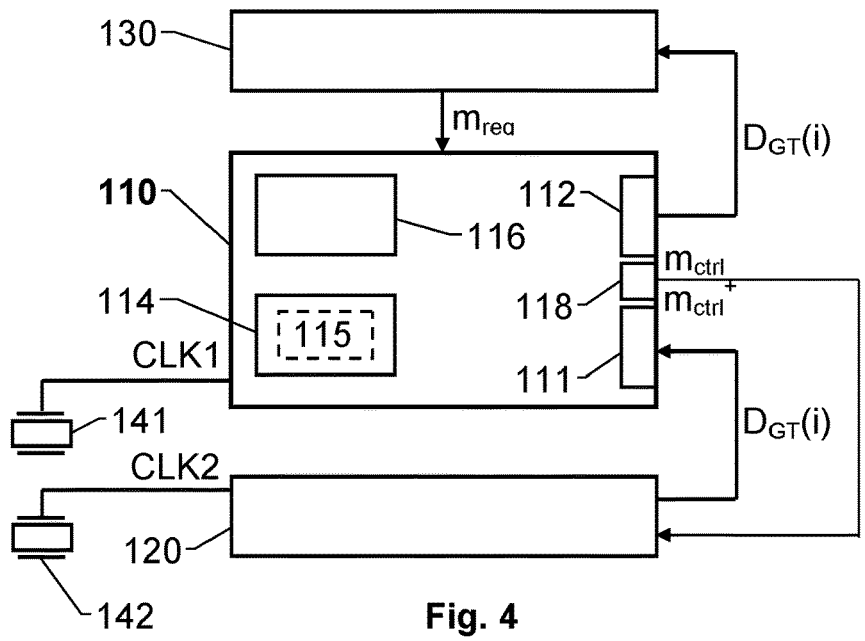
FIG. 4 shows a block diagram over a computer system including an eyetracker, a driver unit and a client according to a second embodiment of the invention.

FIG. 4 shows a block diagram over a computer system including an eyetracker 120, a driver unit 110 and a client 130 according to a second embodiment of the invention. Here, all units, signals and data packets bearing reference signs that are also present in FIG. 1 designate the same units, signals and data packets as described above with reference to FIGS. 1 and 2.

Thus, in contrast to the first embodiment of the invention, in FIG. 4, the driver unit 110 is connected to a first clock generator 141 and the eyetracker 120 is connected to a second clock generator 142, The first clock generator 141 is configured to provide a first time base reference CLK1 for the first frame structure FS1, and the second clock generator 142 is configured to provide a second time base reference CLK2 for the second frame structure FS2.

Here, since a stable temporal relationship between the first and second frame structures FS1 and FS2 neither can be guaranteed nor be expected, the processing circuitry 116 is further configured to execute the following procedure. An updating of the offset $t_{L1}$ between the reception point in time $t_R$ and the delivery point in time $t_{D1}$ is calculated repeatedly. If the updated offset $t_{L1}$ does not lie within the margin $t_m$ prior to the delivery point in time $t_{D1}$, the processing circuitry 116 is configured to send an updated control message $m_{ctrl}^+$ to the eyetracker 120. The updated control message $m_{ctrl}^+$ is adapted to cause the eyetracker 120 to produce at least one future gaze data packet at such an adjusted acquisition instance $t_{DAcq}'$ in the second time structure FS2 that the reception point in time $t_R$ for the at least one future gaze data packet is expected to lie within the margin $t_m$ prior to the delivery point in time $t_{D1}$.

Figure 5:
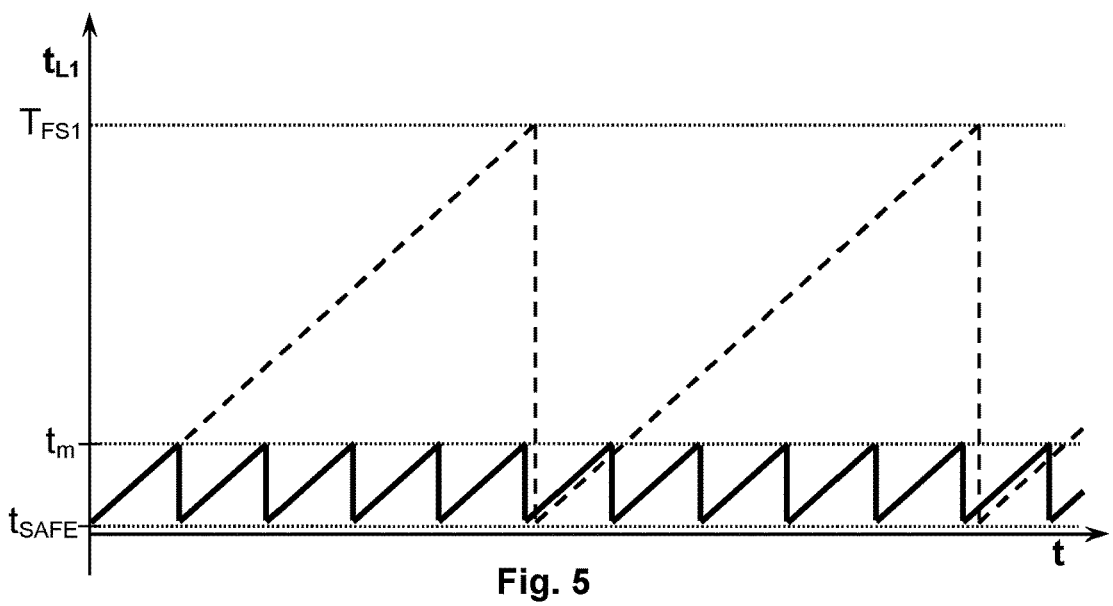
FIG. 5 shows one example of a time sequence according to the second embodiment of the invention.

FIG. 5 shows one example of a time sequence according to the second embodiment of the invention. Here, a linear relative drift between the first and second time base references CLK1 and CLK2 respectively is presumed. As a result, if unadjusted, the offset $t_{L1}$ would gradually increase from zero up to a maximum value equal to a frame period $T_{FS1}$ of the first frame structure FS1. After that the offset $t_{L1}$ had attained this maximum value, it would again had become zero, and so on. However, the repeated updating of the offset $t_{L1}$ between the reception point in time $t_R$ and the delivery point in time $t_{D1}$ constrains the variation in the offset $t_{L1}$ between zero and the margin $t_m$, or between the safety time $t_{SAFE}$ and the margin $t_m$ depending on the control principle being applied.

According to one embodiment of the invention, the processing circuitry 116 is configured to assign the adjusted data acquisition instance $t_{DAcq}'$ on the further basis of a latency $t_{L2}$ in the eyetracker 120 and a transmission delay between the eyetracker 120 and the driver unit 110, i.e. the time difference between the reception point in time $t_R$ and a point in time $t_{D2}$ in the second frame structure FS2 when the gaze data packets $D_{GT}(2)$ and $D_{GT}(3)$ are sent out from the eyetracker 120.

Consequently, the data path between the eyetracker 120 and the driver unit 110 is modeled adequately, and the timing of the gaze data in the client 130 can be made even more accurate with respect to the client's 130 requested delivery point in time $t_{D1}$ in a first time frame structure FS1 as expressed in the request message $m_{req}$.

Figure 6:
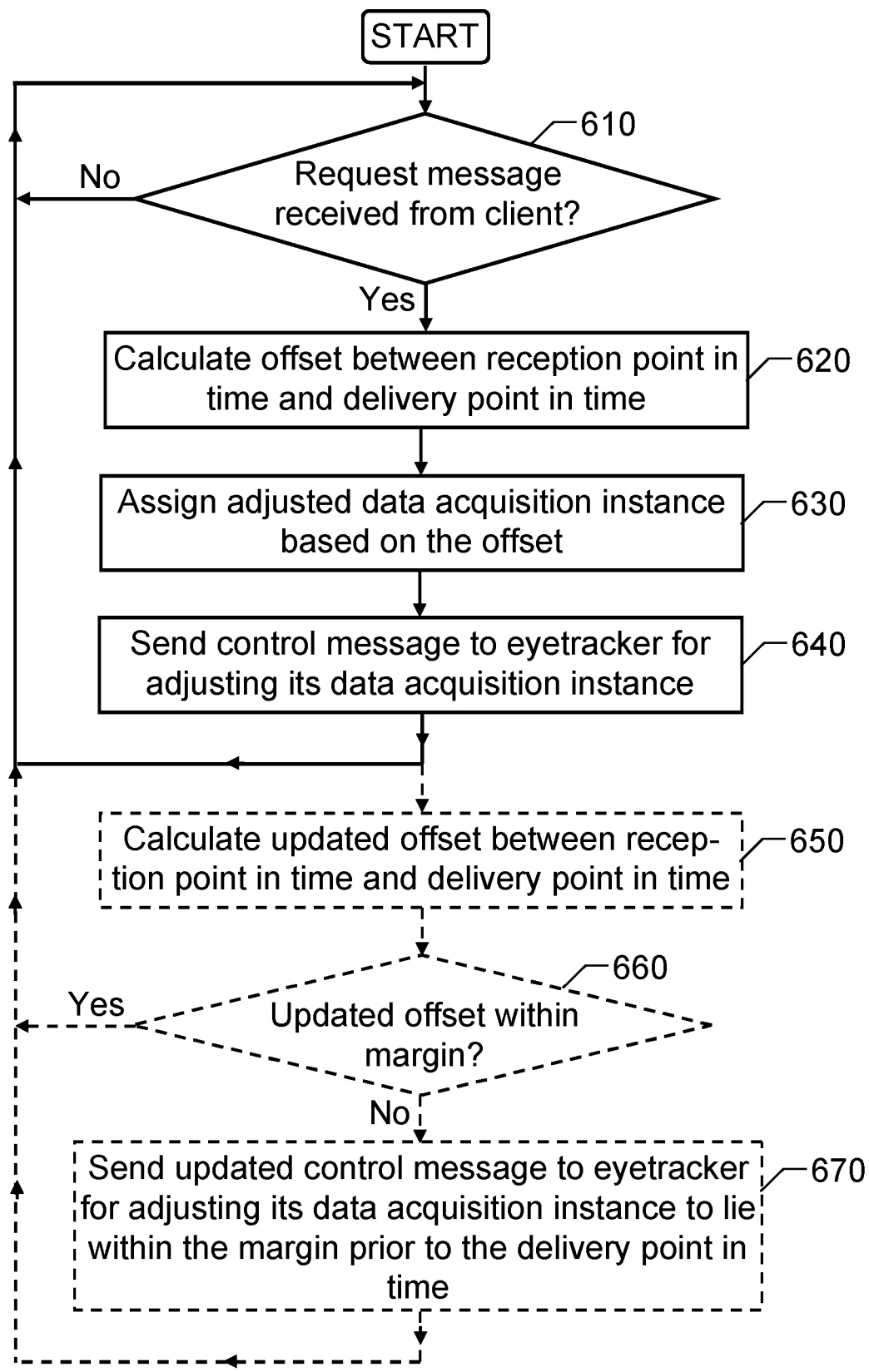
FIG. 6 illustrates, by means of a flow diagram, the general method according to the invention.

In order to sum up, and with reference to the flow diagram in FIG. 6, we will now describe the general method according to the invention for streaming gaze data from an eyetracker to a client via a driver unit. The dashed boxes at the bottom illustrate one embodiment of the invention, which is preferable to apply if the eyetracker and the client use different time base references.

A first step 610, checks if a request message has been received from the client. If so, a step 620 follows; and otherwise, the procedure loops back and stays in step 610. The request message defines a delivery point in time in a first time frame structure at which delivery point in time in each frame of the first time frame structure the gaze data packet shall be provided to the client.

In step 620, an offset is calculated between a reception point in time and the delivery point in time. Then, in a step 630, an adjusted data acquisition instance is assigned based on the offset. The adjusted data acquisition instance represents a modified point in time in a second time frame structure when at least one future gaze data packet shall be produced by the eyetracker.

Subsequently, in a step 640, a control message is sent to the eyetracker. The control message is adapted to cause the eyetracker to produce at least one future gaze data packet at such an adjusted acquisition instance in the second time structure that the reception point in time for the at least one future gaze data packet is expected to lie within a margin prior to the delivery point in time.

Thereafter, according to the general method of the invention, the procedure loops back to step 610. However, if the eyetracker and the client use different time base references, a step 650 may follow.

In step 650, an updated offset is calculated between the reception point in time and the delivery point in time. Then, a step 660, checks if the offset lies within the margin prior to the delivery point in time. If so, the procedure loops back to step 610. Otherwise, a step 670 follows in which an updated control message is sent to eyetracker for adjusting its data acquisition instance to lie within the margin prior to the delivery point in time.

Subsequently, the procedure loops back to step 610.

All of the process steps, as well as any sub-sequence of steps, described with reference to FIG. 6 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A method performed in a driver unit for streaming gaze data packets containing gaze data from an eyetracker to a client, the method comprising:
receiving, repeatedly, in a first interface, gaze data packets from the eyetracker, and
providing, repeatedly, via a second interface, the gaze data packets to the client, wherein providing the gaze data packets to the client comprises:
receiving a request message from the client, which request message defines a delivery point in time at which a respective one of the gaze data packets shall be provided, in each frame of a first time frame structure, to the client via the second interface;
calculating an offset, in the first time frame structure, between (i) a reception point in time indicating when a gaze data packet is received from the eyetracker relative to the first time frame structure and (ii) the delivery point in time at which the gaze data packet shall be provided to the client;
assigning an adjusted data acquisition instance based on the offset, the adjusted data acquisition instance representing a modified point in time in a second time frame structure when at least one future gaze data packet shall be produced by the eyetracker; and
sending a control message to the eyetracker, which control message is adapted to cause the eyetracker to produce the at least one future gaze data packet at the adjusted acquisition instance in the second time frame structure, such that the reception point in time for the at least one future gaze data packet is expected to lie within a margin prior to the delivery point in time; and
synchronizing the second time frame structure to the first time frame structure such that the first time frame structure and the second time frame structure share a common time base reference,
wherein the adjusted acquisition instance in the second time frame structure when the at least one future gaze data packet shall be produced by the eyetracker is such that an expected reception point in time indicating when the at least one future gaze data packet is received from the eyetracker is at least a safety time prior to the delivery point in time.

2. The method of claim 1, wherein the synchronizing of the second time frame structure to the first time frame structure comprises adjusting an interval between consecutive data acquisition instances to match a period of the first time frame structure.

3. The method of claim 1, wherein the first time frame structure is synchronized to a first time base reference different from a second time base reference to which the second time frame structure is synchronized, and the method further comprises:
calculating, repeatedly, an updated offset between the reception point in time and the delivery point in time; and
if the updated offset does not lie within the margin prior to the delivery point in time, sending an updated control message to the eyetracker,
wherein the updated control message is adapted to cause the eyetracker to produce the at least one future gaze data packet at the adjusted acquisition instance in the second time frame structure, such that the reception point in time for the at least one future gaze data packet is expected to lie within the margin prior to the delivery point in time.

4. The method of claim 1, wherein assigning the adjusted data acquisition instance is further based on a latency in the eyetracker and a transmission delay between the eyetracker and the driver unit.

5. A non-transitory computer-readable storage medium comprising computer-executable instructions which when executed by a processor cause the processor to perform operations comprising:
receiving, repeatedly, in a first interface, gaze data packets from an eyetracker, and
providing, repeatedly, via a second interface, the gaze data packets to a client, wherein providing the gaze data packets to the client comprises:
receiving a request message from the client, which request message defines a delivery point in time at which a respective one of the gaze data packets shall be provided, in each frame of a first time frame structure, to the client via the second interface;

calculating an offset, in the first time frame structure, between aa reception point in time indicating when a gaze data packet is received from the eyetracker relative to the first time frame structure and (ii) the delivery point in time at which the gaze data packet shall be provided to the client;

assigning an adjusted data acquisition instance based on the offset, the adjusted data acquisition instance representing a modified point in time in a second time frame structure when at least one future gaze data packet shall be produced by the eyetracker; and sending a control message to the eyetracker, which control message is adapted to cause the eyetracker to produce the at least one future gaze data packet at the adjusted acquisition instance in the second time structure, such that the reception point in time for the at least one future gaze data packet is expected to lie within a margin prior to the delivery point in time; and synchronizing the second time frame structure to the first time frame structure such that the first time frame structure and the second time frame structure share a common time base reference, wherein the adjusted acquisition instance in the second time frame structure when the at least one future gaze packet shall be produced by the eyetracker is such that an expected reception point in time indicating when the at least one gaze data packet is received from the eyetracker is at least a safety time prior to the delivery point in time.

6. A driver unit adapted to stream gaze data packets containing gaze data from an eyetracker to a client, the driver unit comprising:

a first interface configured to receive, repeatedly, gaze data packets from the eyetracker, a second interface configured to provide, repeatedly, the gaze data packets to the client; and processing circuitry configured to control a functioning of the driver unit, wherein the driver unit is configured to:

receive a request message from the client, which request message defines a delivery point in time at which a respective one of the gaze data packets shall be provided, in each frame of a first time frame structure, to the client via the second interface;

calculate an offset, in the first time frame structure, between (i) a reception point in time indicating when a gaze data packet is received from the eyetracker relative to the first time frame structure and (ii) the delivery point in time at which the gaze data packet shall be provided to the client;

assign an adjusted data acquisition instance based on the offset, the adjusted data acquisition instance representing a point in time in a second time frame structure when at least one future gaze data packet shall be produced by the eyetracker; and send a control message, via a control interface, to the eyetracker, which control message is adapted to cause the eyetracker to produce the at least one future gaze data packet at the adjusted acquisition instance in the second time frame structure such that the reception point in time for the at least one future gaze data packet is expected to lie within a margin prior to the delivery point in time, wherein the driver unit and the eyetracker are connected to a common clock generator configured to provide a common time base reference for the first and second frame structures, and wherein the adjusted acquisition instance in the second time frame structure when the at least one future gaze packet shall be produced by the eyetracker is such that an expected reception point in time indicating when the at least one gaze data packet is received from the eyetracker is at least a safety time prior to the delivery point in time.

7. The driver unit of claim 6, wherein the driver unit is connected to a first clock generator configured to provide a first time base reference for the first frame structure and the eyetracker is connected to a second clock generator configured to provide a second time base reference for the second frame structure, and the processing circuitry is further configured to:

calculate, repeatedly, an updated offset between the reception point in time and the delivery point in time; and if the updated offset does not lie within the margin prior to the delivery point in time, send an updated control message to the eyetracker, wherein the updated control message is adapted to cause the eyetracker to produce at least one future gaze data packet at the adjusted acquisition instance in the second time structure such that the reception point in time for the at least one future gaze data packet is expected to lie within the margin prior to the delivery point in time.

8. The driver unit of claim 6, wherein the processing circuitry is configured to assign the adjusted data acquisition instance further based on of a latency in the eyetracker and a transmission delay between the eyetracker and the driver unit.

9. The non-transitory computer-readable storage medium of claim 5, wherein the synchronizing of the second time frame structure to the first time frame structure comprises adjusting an interval between consecutive data acquisition instances to match a period of the first time frame structure.

10. The non-transitory computer-readable storage medium of claim 5, wherein the first time frame structure is synchronized to a first time base reference different from a second time base reference to which the second time frame structure is synchronized, wherein the operations further comprise:

calculating, repeatedly, an updated offset between the reception point in time and the delivery point in time; and if the updated offset does not lie within the margin prior to the delivery point in time, sending an updated control message to the eyetracker, wherein the updated control message is adapted to cause the eyetracker to produce at least one future gaze data packet at the adjusted acquisition instance in the second time frame structure such that the reception point in time for the at least one future gaze data packet is expected to lie within the margin prior to the delivery point in time.

11. The non-transitory computer-readable storage medium of claim 5, wherein assigning the adjusted data acquisition instance is further based on a latency in the eyetracker and a transmission delay between the eyetracker and the driver unit.

* * * * *